March 9, 1937.  F. A. VOLZ  2,073,235

COILABLE MEASURING RULE

Filed Oct. 22, 1935

Inventor
Frederick A. Volz

By K. Clay Lindsey.

Attorney

Patented Mar. 9, 1937

2,073,235

UNITED STATES PATENT OFFICE 2,073,235

COILABLE MEASURING RULE

Frederick A. Volz, New Britain, Conn., assignor to The Stanley Works, New Britain, Conn., a corporation of Connecticut Application October 22, 1935, Serial No. 46,139

3 Claims. (Cl. 33—137)

The present invention relates to coilable rules of the externally wound push-pull type having a casing; a measuring tape adapted to be wound therein into an externally wound coil and being in the form of a strip of metal having a bent transverse form (for example, a concavo-convex cross section) so that it will resist bending and will have a tendency to assume a straight or rod-like form, and resilient winding means within the casing for aiding the measuring tape into coils and having a tension which only substantially counterbalances the resistance of friction of the parts and the tendency of the measuring tape to resist bending, so that it is necessary to manually push the measuring tape into the casing when it is desired to wind the same therein. A rule of this type is disclosed in my Patent No. 1,983,202 dated December 4th, 1934.

In rules of this type, the measuring tape, as it is wound into a coil, will change from a concavo-convex cross section to a flat or straight transverse section at the point of tangency between the extended portion and the coiled portion. While it is possible to nicely and accurately balance the several forces so that an even and smooth action is obtained during the operation of either completely winding or unwinding the tape, and the tape will remain in any extended position to which it has been drawn or pushed, in actual practice there may be a tendency for the tape, when completely pulled out, to creep back somewhat into the casing, particularly if the structure is jarred or moved quickly.

It is the object of the present invention to provide an improved arrangement in which the measuring tape, when it has been withdrawn from the casing to substantially its full extent, will be automatically held against accidental retraction into the casing without the necessity of operating any separate parts or positively interlocking the extended tape to the casing. With this thought in mind, the present invention contemplates providing the measuring tape, adjacent its inner end, with what may be termed a hold-out stop comprising a rigid member secured to, and carried by, the tape and of such character as to prevent longitudinal flexure of the tape over a substantial area adjacent the line of tangency between the coiled portion of the tape and the extended portion thereof.

A further aim of the invention is to provide an improved arrangement wherein the rigid member, which comprises a hold-out stop of the character described, also serves to limit the extent to which the tape may be withdrawn from the casing.

In the accompanying drawing, wherein I have shown, for illustrative purposes, one of the embodiments which the present invention may take:

Figure 1:
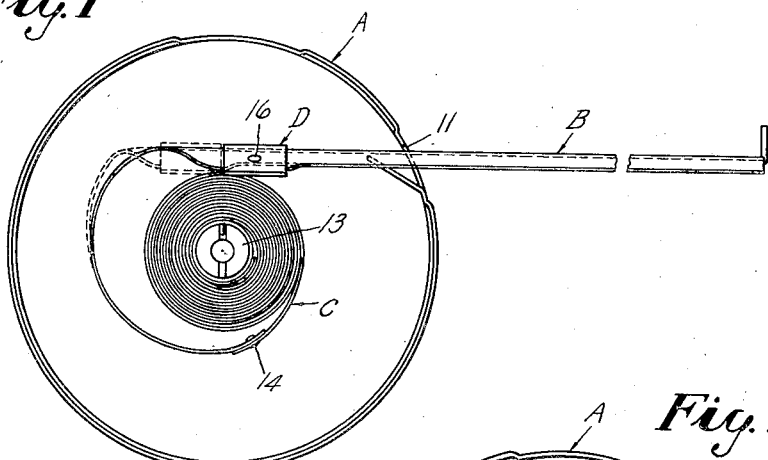
Figure 1 is a side view of a measuring rule constructed in accordance with the present invention with one-half of the casing removed and showing the hold-out stop in position for preventing accidental retraction of the tape into the casing.

Referring more particularly to the drawing, A denotes a casing of any suitable type provided with an entrance slot 11 having, adjacent its opposite ends, internal shoulders 12. B is the measuring tape and comprises a thin strip of metal having a concavo-convex cross section. The letter C designates a winding strip, the inner end of which is connected to a central post 13 and the outer end of which is connected to the inner end of the tape, as at 14. The winding strip or spring C has a tension which only substantially counterbalances the resistance of friction of the parts and the tendency of the measuring tape to resist bending as to provide a rule of the pull-push type, as previously described.

In accordance with the present invention, there is secured to the measuring tape, adjacent its inner end, a rigid member D which, when the tape is drawn out to substantially its full extent, that is, to such an extent that the scale thereon is completely uncovered, will prevent the extended portion of the tape, at the point of tangency, from flexing longitudinally over an appreciable extent. By peference, this hold-out member comprises a piece of sheet metal of substantial length in the direction of the length of the tape and having a transverse curvature corresponding generally to the normal transverse curvature of the tape. This rigid member may be secured to the tape in any suitable manner as, for example, by means of rivets 16. The width of the rigid member is preferably such that the ends thereof extend beyond the margins of the tape so as to form extensions which are adapted to engage the shoulders 12 on the casing at the opposite ends of the entrance slot so as to limit the extent to which the tape may be pulled from the casing.

Figure 2:
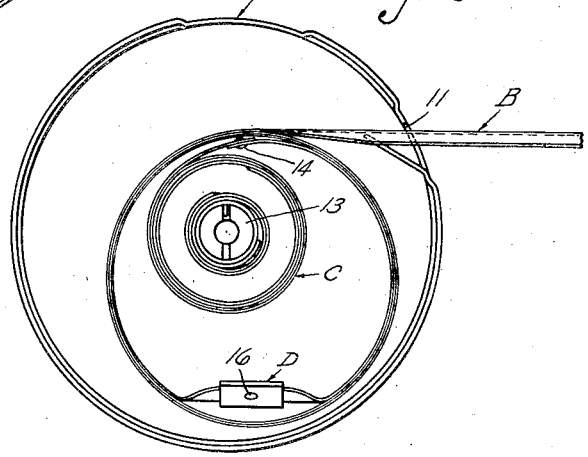
Fig. 2 is a view similar to Fig. 1 but showing the measuring tape partially wound into the casing.
Figure 3:
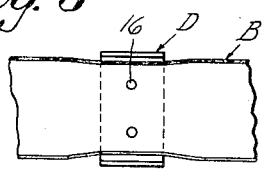
Fig. 3 is a detail view looking at the inner or concave side of the hold-out stop and the portion of the tape to which it is secured.
Figure 5:
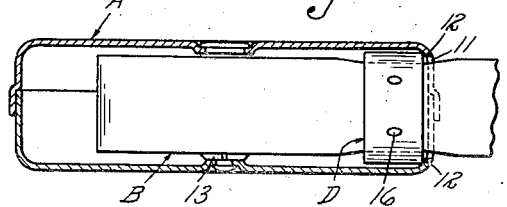
Fig. 5 is a transverse sectional view through the casing and illustrates the manner in which the member, which constitutes the hold-out stop, acts to limit the extent to which the tape is withdrawn from the casing.
Figure 4:
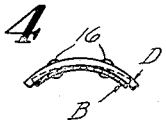
Fig. 4 is a transverse sectional view through the tape and illustrates the hold-out stop in edge view.

As will be seen from Fig. 2, during the normal operation of pushing the tape into the casing, the extended portion of the tape, adjacent the point of tangency with the coiled portion thereon, readily changes from a concavo-convex form to a flat transverse shape and, if the parts are accurately balanced, the tape will remain in any extended position. However, when the tape is substantially entirely unwound, it has been found that, if the rule is jarred, the tape may creep or jump back somewhat into the casing. By providing the member D, this is prevented. This member D, when the tape is pulled out to the extent shown in Fig. 1, maintains that part of the extended portion of the tape, which is adjacent the point of tangency between the extended portion and the coil, substantially straight in the direction of its length so that it cannot readily flex and, since the winding spring has a tension which only substantially counter-balances the resistance or friction of the parts and the tendency of the normal portion of the tape to resist bending, there is not sufficient force present in the device to cause the tape to creep or jump back into the casing in the event the rule is jarred. It is, therefore, necessary to positively exert a pushing force on the extended portion of the tape in order to start the winding operation. By transversely curving the member D, the tape portions at each end thereof are maintained in concavo-convex transverse section, so that the effectiveness of the hold-out stop is increased. With the parts as shown in Fig. 1, when the winding up operation is initiated by pushing on the extended portion of the tape, the member D will move more or less in a tangential line over the top of the coil and, when it has reached the approximate position shown by dotted lines in Fig. 1, the winding spring will become effective to cause the tape to bend substantially at the point of tangency and assume a flat transverse form at that point.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coilable measuring device of the character described, a casing having an entrance slot, a measuring tape adapted to be moved through said slot and to be wound within the casing in an externally wound coil and being in the form of a strip of metal having a concavo-convex cross section and an inherent tendency to assume a rectilinear state, resilient means within the casing and secured to the inner end of said tape for aiding the measuring tape into a coil and having a tension which only substantially counterbalances the resistance of friction of the parts and the tendency of the measuring tape to resist bending, and a rigid member secured to said tape adjacent the inner end thereof and supporting a portion of the tape against bending throughout a substantial area whereby said member, when at the inner end of the extended portion of the tape and at the point of tangency with the coiled portion, will prevent the tape from creeping into the casing.

2. In a coilable measuring device of the character described, a casing having an entrance slot, a measuring tape adapted to be moved through said slot and to be wound within the casing in an externally wound coil and being in the form of a strip of metal having a concavo-convex cross section and an inherent tendency to assume a rectilinear state, resilient means within the casing and secured to the inner end of said tape for aiding the measuring tape into a coil and having a tension which only substantially counterbalances the resistance of friction of the parts and the tendency of the measuring tape to resist bending, and a rigid member transversely curved correspondingly to and secured to said tape adjacent the inner end thereof and supporting a portion of the tape against longitudinal bending and preventing transverse flattening of said tape portion over a substantial area whereby said member, when at the inner end of the extended portion of the tape and at the point of tangency with the coiled portion, will prevent the tape from creeping into the casing.

3. In a coilable measuring device of the character described, a casing having an entrance slot and an internal shoulder at each end of said slot, a measuring tape adapted to be moved through said slot and to be wound within the casing in an externally wound coil and being in the form of a strip of metal having a concavo-convex cross section and an inherent tendency to assume a rectilinear state, resilient means within the casing and secured to the inner end of said tape for aiding the tape into a coil and having a tension which only substantially counterbalances the resistance of friction of the parts and the tendency of the measuring tape to resist bending, and a rigid member secured to said tape adjacent the inner end thereof and preventing bending of the tape over a substantial area whereby said member, when at the inner end of the extended portion of the tape and at the point of tangency with the coiled portion, will prevent the tape from creeping into the casing, said rigid member extending beyond the margins of the tape so as to form extensions adapted to engage said shoulders so as to limit the extent to which the tape may be pulled from the casing.

FREDERICK A. VOLZ.